Feb. 3, 1942.  J. A. CHAPPUIS  2,271,732
LOCK WASHER
Filed March 20, 1939  3 Sheets-Sheet 1
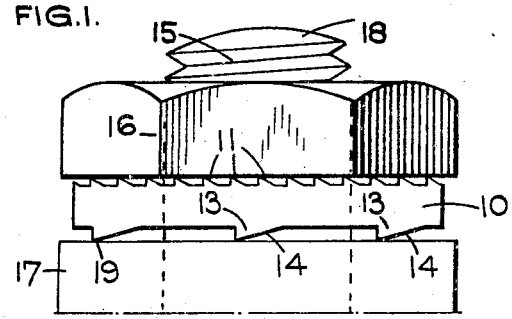
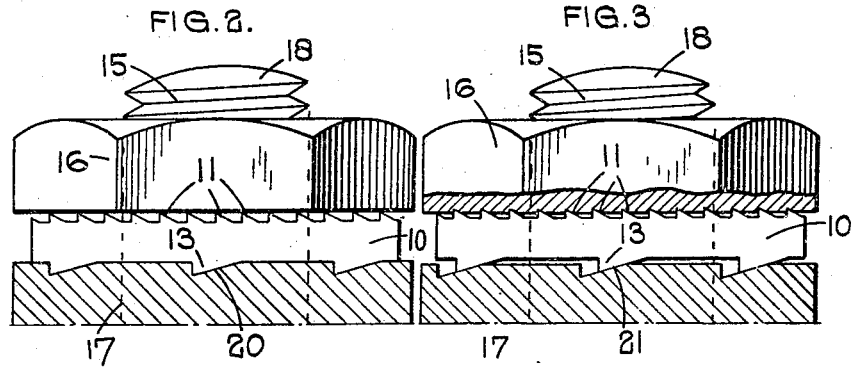
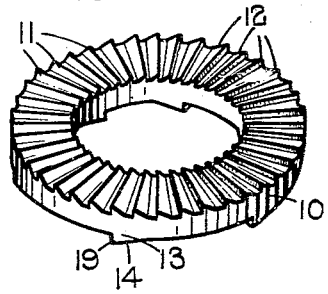 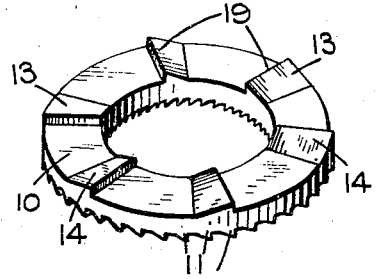
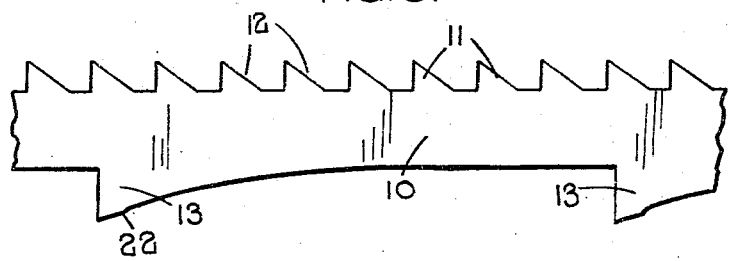
Inventor
John Albert Chappuis
by
Saulnier & Saulnier
Attorneys Feb. 3, 1942. J. A. CHAPPUIS 2,271,732
LOCK WASHER
Filed March 20, 1939 3 Sheets-Sheet 2
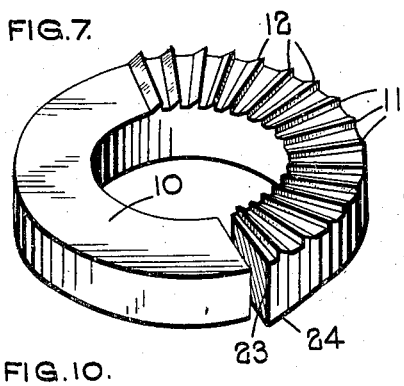
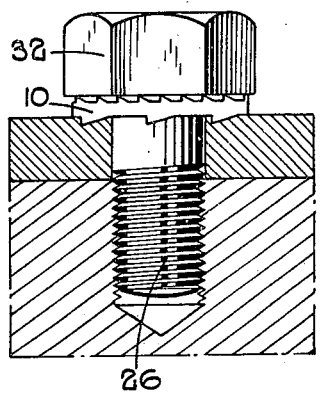
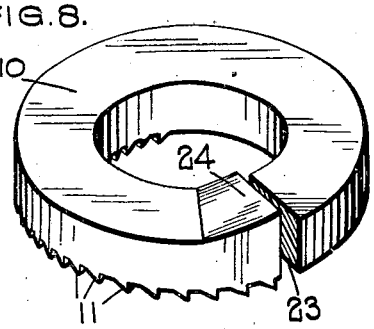
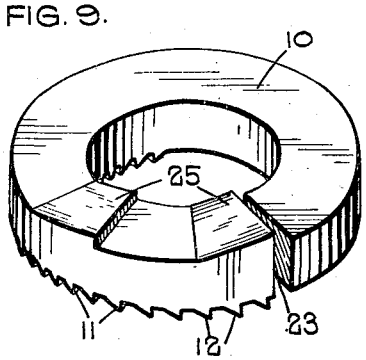
Inventor
John Albert Chappuis Patented Feb. 3, 1942

2,271,732

UNITED STATES PATENT OFFICE 2,271,732

LOCK WASHER

John Albert Chappuis, Neuchatel, Switzerland
In Great Britain October 4, 1938

Application March 20, 1939, Serial No. 263,010

3 Claims. (Cl. 151—35)

This invention relates to lock washers of the kind provided with teeth of ratchet-like form adapted to produce a wedging action between the work and the nut when the latter is unscrewed.

By the expression "teeth of ratchet-like form" I mean teeth which have their leading sides (in the direction of rotation and screwing up) at right angles or steeply inclined to the face of the washer, and have their following sides formed to a more gentle incline in relation to the face of the washer, so that the teeth are of substantially ratchet form in cross section. The following sides, however, are more steeply inclined than, and inclined in the same direction as, the screw thread of the screw threaded member. These teeth are shaped to resist relative motion with the part with which they are in contact when the nut or other screw threaded member is tightened.

The object of the present invention is to provide an improved locking washer which can be used without either using a second washer or providing projections or the like on the nut or workpiece, and which, further, can be used successfully either way up, i. e. with either side directed towards the nut.

It will be understood that the improved locking washer may be used between a nut which is screwed on to a threaded stem and a workpiece. Alternatively, the locking washer may be used between the head of a set screw or stud and an adjacent workpiece. Also the locking washer may be used between a head or shoulder on a bolt and the adjacent workpiece.

One of the features of the present invention is that my improved locking washer is made of hard metal and its teeth are adapted to indent the work, nut, or other threaded member and so produce therein inclines or surfaces with which the inclines on the teeth of the washer can cooperate to produce the wedging action when a force is applied to unscrew the nut or other threaded member.

For instance, I may provide a hard metal washer for locking a screw threaded member from loosening, the washer consisting of a ring (which may be gapped or not) having upon one side teeth shaped to permit of relative rotary motion between the washer and the adjacent part (nut or other screw threaded member or workpiece) when screwing on the screw threaded member, but to resist or prevent such relative rotary motion when unscrewing the screw threaded member, and having on its opposite side a tooth or teeth of ratchet-like form, the following side or sides of the tooth or teeth being inclined in the same direction but more steeply than the screw thread of the screw threaded member, and the teeth, if more than one, being so few in number that when the nut or threaded member is tightened, the local pressure generated between them and the part (work or nut or other threaded member) with which they are in contact, will be sufficiently intense as to cause them to indent that part, whereby upon a force being applied to unscrew the threaded member, relative rotary motion will take place between the ratchet-like tooth or teeth and the indentations, thus producing a wedging action.

With a washer constructed in this manner, assuming that the metal is at least as hard as, and preferably harder than, that of the workpiece and nut or the head or shoulder of the threaded member, an effective locking will be secured whichever way up the washer is put.

The teeth upon the one side of the washer which permit relative rotary motion between the washer and the adjacent part when the nut is tightened but resist such relative motion if a force is applied to unscrew the nut, may themselves be of ratchet form, and the inclines of such ratchet teeth may be opposite to the inclination of the screw thread. Such teeth may be provided over the whole of the surface on one side of the washer, or over a part of the surface only.

The washers constructed in accordance with the present invention may be gapped and one end may be displaced in a direction parallel to the axis relatively to the other, so that they will act like spring washers in the event of the nut or screw threaded member not having been tightened sufficiently to produce the indentations.

Referring to the drawings:

Figure 1 is a side view showing one application of the invention before the nut is tightened up.

Figure 2 is a similar view partly in section showing the parts after the nut has been tightened up.

Figure 3 is a similar view partly in section showing the parts after an unscrewing force has been applied to the nut.

Figure 4 is a perspective view of the washer.

Figure 5 is another perspective view of the washer in the reverse position.

Figure 6 is a view showing a modification.

Figure 7 is a perspective view showing a further modification.

Figure 8 is a perspective view of the washer shown in Figure 7, but in the reverse position.

Figure 9 is a perspective view showing a further modification.

Figure 10 is a sectional view showing the application of the washer under the head of a set screw.

Figure 11 is a view showing the application of the washer adjacent to a bolt head.

Figure 12:
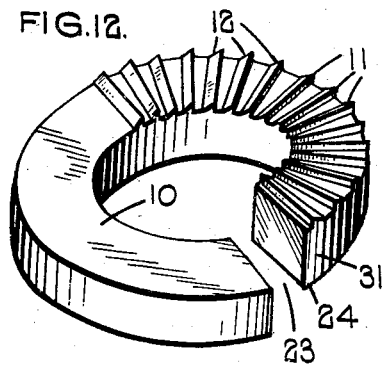
Figure 12 is a perspective view showing a washer constructed in accordance with this invention and which has been distorted to provide a spring lock.

In Figures 1, 2 and 3, the illustrations are to some extent diagrammatic, the size of the indentations produced by the teeth being exaggerated.

In the construction shown in Figures 1 to 5, the washer consists of a flat ring of metal. In the construction illustrated, the ring is continuous but it may be gapped at any point if desired. On the one side the washer 10 is provided with a large number of teeth 11 of ratchet form, the inclines 12 of these teeth being in a direction opposite to that of the screw thread with which the washer is to be used.

On the opposite side the washer is provided with relatively few ratchet teeth 13, the inclined sides 14 of which are inclined in the same direction as the screw thread 15 but more steeply.

As shown in Figures 1 to 3, the washer is placed with the teeth 11 uppermost in contact with the undersurface of the nut 16. The workpiece is shown at 17, and the bolt at 18.

When the nut 16 is screwed down towards the workpiece 17, the teeth 11 allow the nut to slide over them so that relative rotary motion takes place between the nut and the washer 10, the washer 10 remaining stationary.

There are six of the teeth 13, and if desired there may be more or any less number, so that the whole of the pressure produced by screwing down the nut is transmitted, in the construction illustrated, to six sharp edges indicated at 19 and formed at the angles of the teeth 13. These edges, particularly if the washer is of harder material than the workpiece, form ratchet-shaped indentations 20 in the workpiece. It is unlikely that the teeth 13 become entirely buried in the material of the workpiece, but sufficient indentation is obtained. The number of the teeth 13 must not be so great as will prevent the indentation of the part with which they are in contact when the nut is tightened on the bolt.

When a force is applied to unscrew the nut 16, the teeth 11 prevent or limit relative rotation between the nut 16 and the washer 10, so that the washer turns with the nut, causing the teeth 13 to ride up the inclines 21 of the recesses 20. Since these inclines are steeper than the screw thread 15, a wedging action is set up between the parts, so that the nut is securely locked against unscrewing.

If required, the exterior of the washer 10 may be non-circular so that it can be held by means of a spanner against rotation when it is desired to unscrew the nut 16. The arrangement is effective against the unintentional loosening of the nut under vibration.

If required the teeth 13 may terminate at the edges 19 with radial cutting ribs 22 to facilitate the indenting process as shown in Figure 6.

In the construction shown in Figure 10, the washer 10 is housed under the head 32 of a set screw 26. In this case the action is exactly the same as in the construction shown in Figures 1 to 5.

In Figure 11 a washer 10 is shown placed between the head 27 of a bolt 28 and the adjacent workpiece 29 with the object of preventing the bolt from unscrewing from the nut 30.

A further modification is shown in Figures 7 and 8, wherein the teeth 11 extend only partly around one side of the ring forming the washer, and the washer is provided with a gap 23 and has only one ratchet tooth indicated at 24 corresponding with the teeth 13. The tooth 24 is formed adjacent the gap 23. The gap 23 need not be radial. In operation this washer works exactly like that described with reference to Figures 1 to 5.

A further modification is shown in Figure 9, where the ratchet teeth 11 extend only partly around a washer having a gap 23, and wherein the opposite side of the washer is provided with two ratchet teeth 25 corresponding with the ratchet teeth 13.

Figure 13:
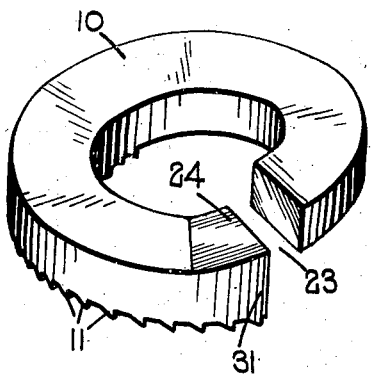
Figure 13 is a perspective view of the washer shown in Figure 12 in the reverse position.
Figure 14:
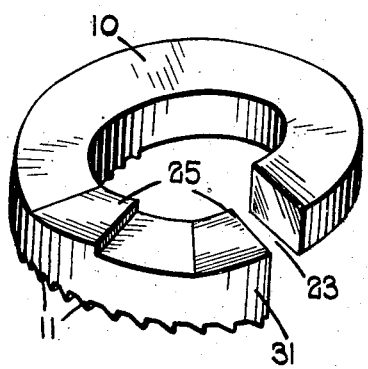
Figure 14 is a perspective view of a washer similar to that shown in Figure 9 but distorted to provide a spring lock.

The constructions shown in Figures 12, 13 and 14 correspond with those shown in Figures 7, 8 and 9 except that one end 31 of each washer is displaced in a direction parallel to the axis, so that the washers shown in Figures 12, 13 and 14 are constructed to provide a spring lock in addition to the wedging lock.

In all constructions the arrangement is equally effective whichever side of the washer is directed towards the nut.

As shown in Figures 1 to 3, the small teeth 11 are directed towards the nut. If the large teeth 13 are directed towards the nut, then when the nut is screwed up, the washer turns with the nut, as the teeth 11 can slide over the surface of the workpiece, whereas relative motion between the teeth 13 and the nut is opposed by the teeth 13. On screwing up tightly, the teeth 13 indent into the material of the nut, and on attempting to unscrew, the inclines of the indentations formed in the nut tend to ride up the steep inclines 14 and thus produce a wedging action.

What I claim then is:

1. A locking washer for engagement between a rotary abutment screwed upon a threaded stem and a fixed abutment upon which said rotary abutment acts, said washer comprising a single ring of metal adapted to encircle said stem, a plurality of ratchet teeth on one side of said washer arranged to allow angular slip between the adjacent abutment and said washer when said rotary abutment is turned in the tightening direction and to resist such slip by biting into the adjacent abutment when said rotary abutment is turned in the slackening direction, and a much smaller number of hardened spurs on the opposite side of said washer adapted to indent the adjacent abutment on application of axial pressure to said washer, said spurs being of ratchet form and of opposite hand to said ratchet teeth, the sloping faces of said spurs being inclined in the same direction as the screw-thread on said stem but at a lesser angle to the axis of the latter.

2. A locking washer for engagement between a rotary abutment screwed upon a threaded stem and a fixed abutment upon which said rotary abutment acts, said washer comprising a flat gapped ring of metal adapted to encircle said stem, a plurality of ratchet teeth on one side of said washer and at one side only of the gap therein, said ratchet teeth being arranged to allow angular slip between the adjacent abutment and said washer when said rotary abutment is turned in the tightening direction and to resist such slip by biting into the adjacent abutment when said rotary abutment is turned in the slackening direction, and a much smaller number of hardened spurs on the opposite side of said washer and at the same side of the gap therein as said ratchet teeth adapted to indent the adjacent abutment on application of axial pressure to said washer, said spurs being of ratchet form and of opposite hand to said ratchet teeth, the sloping faces of said spurs being inclined in the same direction as the screw-thread on said stem but at a lesser angle to the axis of the latter.

3. A locking washer for engagement between a rotary abutment screwed upon a threaded stem and a fixed abutment upon which said rotary abutment acts, said washer comprising a gapped ring of resilient metal having a helical form and adapted to encircle said stem, a plurality of ratchet teeth on one side of said washer and at one side only of the gap therein, said ratchet teeth being arranged to allow angular slip between the adjacent abutment and said washer when said rotary abutment is turned in the tightening direction and to resist such slip by biting into the adjacent abutment when said rotary abutment is turned in the slackening direction, and a much smaller number of hardened spurs on the opposite side of said washer and at the same side of the gap therein as said ratchet teeth, said spurs not engaging the adjacent abutment when said washer is unstressed but being adapted to indent said adjacent abutment on application of axial pressure to said washer, said spurs being of ratchet form and of opposite hand to said ratchet teeth, the sloping faces of said spurs in the stressed condition of said washer being inclined in the same direction as the screw-thread on said stem but at a lesser angle to the axis of the latter.

JOHN A. CHAPPUIS.